United States Patent
Goode et al.

(10) Patent No.: US 6,391,986 B1
(45) Date of Patent: May 21, 2002

(54) CONTROL OF SOLUTION CATALYST DROPLETS

(75) Inventors: Mark Gregory Goode, Hurricane; Clark Curtis Williams, Charleston, both of WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/730,290

(22) Filed: Dec. 5, 2000

(51) Int. Cl.⁷ .................................................. C08F 2/34
(52) U.S. Cl. ............................. 526/88; 526/86; 526/68
(58) Field of Search ............................. 526/86, 88, 68, 526/901

(56) References Cited

U.S. PATENT DOCUMENTS 4,238,453 A    12/1980  Van den Bossche ........ 422/131
5,693,727 A    12/1997  Goode .......................... 526/86
6,075,101 A  *  6/2000  Lynn et al. .................... 526/86

FOREIGN PATENT DOCUMENTS

| EP | 428056 | 1/1994 |
| WO | WO 93/07188 | 4/1993 |
| WO | WO 94/15977 | 7/1994 |
| WO | WO 96/40427 | 12/1996 |
| WO | WO 97/46599 | 12/1997 |

* cited by examiner

Primary Examiner—David W. Wu
Assistant Examiner—William Cheung

(57) ABSTRACT

A process, carried out in the gas phase, comprising contacting one or more olefins with a catalyst system containing a carrier gas and a mixture of solids comprising a transition metal compound or complex and a liquid organic solvent, under polymerization conditions, in a fluidized bed reactor containing resin particles in a fluidized state with the provisos that (a) the mixture of solids and solvent contains at least about 95 percent by weight solids and (b) the mixture is sprayed with the carrier gas into a particle-lean zone, or the fluidized bed, of the reactor.

11 Claims, No Drawings

US 6,391,986 B1

CONTROL OF SOLUTION CATALYST DROPLETS

TECHNICAL FIELD

This invention is concerned with controlling polymerization process parameters through catalyst droplets used in the process.

BACKGROUND INFORMATION

The gas-phase polymerization of olefins in fluidized bed reactors with catalysts in liquid form is well known. In such systems, resin particle size can be controlled by spraying the liquid catalyst in droplet form into a zone which is substantially free of resin (a particle-lean zone). This process allows a brief period of time for the spray droplets to undergo evaporation and solidify before contacting the polymer particles already in the reactor thus reducing the tendency for the droplets to adhere to the already formed particles and form agglomerates. One solution for the problem of agglomerates is described in U.S. Pat. No. 6,075,101 and is accomplished by using a perpendicular spray nozzle together with other process conditions.

Spraying a solution-borne catalyst into a fluidized bed reactor offers significant operational versatility. Because the spray droplets travel at very high speeds, about 150 to 200 feet per second, the droplets must, as noted above, become solid particles within a very short time to avoid the formation of agglomerates. There are a number of factors that influence spray efficiency such as spray nozzle design, shroud design, and liquid and gas flow rates, and most of these factors have been considered. Industry, however, is constantly trying to improve the efficiency of catalyst spray systems and the polymerization processes in which they are used.

DISCLOSURE OF THE INVENTION

An object of this invention, then, is to provide a polymerization process serviced by a more efficient liquid catalyst spray delivery. Other objects and advantages will become apparent hereinafter.

According to the present invention, such a process has been discovered. The process, carried out in the gas phase, comprises contacting one or more olefins with a catalyst system containing a carrier gas and a mixture of solids comprising a transition metal compound or complex and a liquid organic solvent, under polymerization conditions, in a fluidized bed reactor containing resin particles in a fluidized state with the provisos that (a) the mixture of solids and solvent contains at least about 95 percent by weight solids and (b) the mixture is sprayed with the carrier gas into a particle-lean zone, or the fluidized bed, of the reactor.

In a more particular embodiment, the process carried out in the gas phase comprises contacting one or more olefins with a catalyst system containing a carrier gas and a mixture of solids comprising a transition metal compound or complex and a liquid organic solvent, under polymerization conditions, in a fluidized bed reactor containing resin particles in a fluidized state with the following provisos:

(a) the catalyst system is first introduced into one or more nozzles, each having an inlet at one end and an exit tip at the other end, said nozzles being adapted to convert the catalyst system into droplets and spray the droplets into the fluidized bed reactor;

(b) the temperature of the catalyst system, as introduced into each nozzle, is in the range of about minus 20 to about 120 degrees C. (preferably about 0 to about 30 degrees C.);

(c) the weight ratio of the carrier gas to the solvent, as introduced into each nozzle, is in the range of about 0.15:1 to about 20:1;

(d) the weight ratio referred to in proviso (c) is adjusted to provide a temperature in the nozzle and at the tip of each nozzle at about the dew point of the solvent;

(e) the temperature provided in proviso (d) is such that the droplets formed at the tip of the nozzle contain at least about 95 percent by weight solids; and (f) the droplets are sprayed from the nozzle into a particle-lean zone, or the fluidized bed, of the reactor.

DESCRIPTION OF THE PREFERRED EMBODIMENT(S)

The term "essentially solids" is defined as the mixture of solids and solvent or the droplet containing at least about 99 percent solids. This mixture can also be referred to as "dry". It's noted that when an aluminoxane cocatalyst is included, the solids become viscous and appear glassy or gelatinous. The term "at about the dew point of the solvent" is the dew point of the solvent plus or minus about 5 degrees C.; the higher the temperature within the range, the greater the solids content. Thus, at the superheated temperature of dew point plus 5 degrees C., the mixture of solids and solvent is essentially solids or dry. The term "solvent" includes the conventional liquid organic solvents mentioned below and any other organic liquids, e.g., 1-hexene, which are included in the catalyst system, and are introduced into, and can be vaporized in, the nozzle or injection tube.

The "particle-lean zone" is defined as follows: a section of the reactor which normally does not contain the fluidized bed, such as the disengaging section, the gas recirculation system, or the area below the distributor plate; or a section of the reactor which normally would contain the fluidized bed such as a region in which the polymer resin particle density is, for example, at least 2 times lower, preferably about 5 times lower, and most preferably about 10 times lower than that in the fluidized bed. This region is created by deflecting resin away from the catalyst spray with a stream of gas. Methods for creating a particle-free zone and spraying catalyst are described in U.S. Pat. Nos. 5,693,727 and 5,948,871. In a preferred embodiment, the catalyst in a carrier gas such as nitrogen, argon, an alkane, or mixtures thereof is surrounded by a least one gas which serves to move or deflect resin particles in the bed out of the path of the catalyst as it enters the fluidization zone and away from the area of catalyst entry thereby providing a particle lean zone. In a particularly preferred embodiment, the catalyst in the carrier gas is surrounded by at least two gases, the first gas serving primarily to deflect resin particles of the bed out of the path of the liquid catalyst and the second primarily prevents the catalyst injection tube or nozzle tip from getting clogged. The catalyst delivery system comprises a particle-deflecting tube (also known as a plenum) enclosing an optional tip-cleaning tube (also known as a support tube or catalyst support tube) which in turn encloses a catalyst injection tube. Each of these tubes contain a gas, which can act as a particle deflector. The gas in the tip-cleaning tube can, by itself, function as a particle-deflector. When the catalyst in the carrier gas is surrounded by two gases, the catalyst is considered to be shrouded. Preferably, the particle-deflecting plenum gas can be all or a portion of the recycle gas and the tip-cleaning gas can be all or a portion of one or more of the monomers (e.g., ethylene or propylene) employed in the process.

Methods for controlling the temperature of the droplets are numerous and varied ranging from presaturating the carrier gas with the most volatile component of the catalyst solution to passing the entire spray mixture from which the droplets are created through a heat exchanger prior to exiting the spray nozzle. In addition, the temperature of any or all of the components of the spray mixture can be individually controlled prior to mixing. Examples of such components include the activated or unactivated transition metal compound or complex in solution, make-up solvent, and the carrier gas. It is noted that a vaporized solvent could be used as a substitute for the carrier gas.

Another way to control the temperature of the droplets is to control the temperature of the "support tube" or "plenum" gas, i.e., gas flows surrounding the injection nozzle that are typically used to keep resin particles away from the nozzle tip or to help create a particle-lean zone into which the droplets are sprayed. These gases not only change the temperature of the immediate environment of the droplets, but can also affect the temperature of the liquid catalyst system in the nozzle or injection tube if it is in thermal contact with these gases for a sufficient period of time. It is usually desirable to minimize the thermal stress on the liquid catalyst system by either heating it briefly and rapidly or else by heating one of its components, which is then mixed with the other components of the liquid catalyst system just prior to injection.

In another and preferred embodiment of this invention, it is found that that the temperature of the droplet in the nozzle and at the tip of the nozzle can be controlled by manipulating the weight ratio of the carrier gas to the solvent. As noted above the initial weight ratio of carrier gas to solvent at the entry point of the nozzle is in the range about 0.15:1 to about 20:1, and is preferably in the range of about 0.25:1 to about 6:1. Increasing the ratio increases the temperature and decreasing the ratio decreases the temperature. Since changes in temperature affect the solids content of the droplet, it is apparent that manipulating the ratio also controls the solids content of the droplet.

It is observed that a catalyst (transition metal compound or complex)/cocatalyst/liquid olefin, e.g., 1-hexene, becomes enriched, for example, in hexane solvent relative to isopentane, as the temperature at the tip of the nozzle is increased. This means that the droplets, which leave the nozzle, will not cool as much as they would if they contained more isopentane. By increasing the nozzle temperature, then, the droplets can therefore spend more of their early microseconds at a higher temperature. The same effect can be achieved by changing the ratio of 1-hexene or hexane (or other higher boiling solvent) to isopentane (or other lower boiling solvent). In view of the high solids content and low solvent content, this method of maintaining higher droplet temperatures is not as effective as with a high solvent content droplet.

The control of catalyst droplet size can be described as follows: In general, for a given two-fluid or gas-assisted atomization nozzle and a given reactor pressure, the droplet size is a function of the atomization gas flow rate, the total liquid flow rate, and the liquid properties of viscosity, density, and surface tension. At low liquid viscosity, the flow rate of atomization gas has the strongest influence on the droplet size particularly with respect to perpendicular spray nozzles. The droplet size distributions from a perpendicular spray nozzle are measured with an imaging system on a spray of 9.1 kilograms per hour of catalyst solvent in an off-line reactor at a pressure of 1962 kPa (kilopascals). The average droplet size is found to decrease rapidly with increasing nitrogen flow. Generally, for gas-assisted atomization, an increase in the total liquid feed rate at constant gas feed rate will increase the droplet size. (See, e.g., Lefebvre, A. H., *Atomization and Sprays*, Taylor and Francis, Hemisphere Publishing Corporation, 1989. (pages 228 to 264). For the perpendicular spray nozzle, the average droplet size is essentially constant over the practical range of delivery of 5 to 10 kilograms per hour of liquid at a 9 kilogram per hour nitrogen atomization rate. Furthermore, over the range studied for the perpendicular spray nozzle, the changes in the liquid properties (density, viscosity, and surface tension) resulting from dilution of the catalyst/ cocatalyst solution with additional solvent are predicted by the off-line reactor studies to have only a minor influence on the droplet size when compared with the effect of the atomization gas flow rate. However, the off-line study did not account for the fact that a considerable portion if not all of the liquid (solvent, catalyst and activation) can be evaporated in the catalyst injection tube into the gaseous carrier due to the heating of the tube. This can greatly increase the gas to liquid ratio at the nozzle tip and change the gas properties. The anticipated effect is to decrease the droplet particle size. Furthermore, the viscosity of the remaining liquid can increase dramatically due to the presence of the aluminum alkyl or aluminoxane [MAO (methylaluminoxane) and MMAO (modified methylaluminoxane)]. The MMAO can in particular form a matrix that retains some of the other liquids, particularly solvents and catalyst. The MAO tends to form more of a glassy, solid. Nevertheless, the viscosity of the remaining compounds can be greatly increased. Such an increase in viscosity is anticipated to increase the droplet particle size. Therefore, the droplet particle size can pass through a minimum as the amount of liquid at the atomization tip is decreased, initially becoming smaller due to the increased gas to liquid ratio at the tip and then growing larger as the viscosity of the mix increases.

A similar yet different minimum in the droplet particle size is reported by Inamura and Magai [The relative Performance of Externally and Internally-Mixed Twin-Fluid Atomizers, Proceedings of the $3^{rd}$ International Conference on Liquid Atomization and Sprays, London, July 1985, pages IIC/2/1 to 11]. They flowed air at a uniform velocity through a vertically mounted cylindrical nozzle and used a thin annular slot, 1 millimeter in width to inject liquid along the inside wall of the nozzle. Water, ethanol, and glycerin solutions were used. Gas velocities ranged from 120 to 300 meters per second and the range of gas to liquid flows was about 1 to 10. At gas flow rates of 120 and 150 meters per second, the droplet particle size passed through a minimum as the gas to liquid ratio increased. The minimum size was at about a 3.5 gas to liquid ratio for 120 meters per second, and at about 4.5 gas to liquid ratio for 150 meters per second. The minimum was attributed to a transition from one mode of atomization to another—a transition from "atomization by ligament formation" to an "atomization by film formation." In both cases, liquid emerged from the nozzle tip, as liquid ligaments in one case and a thin continuous film at the nozzle edge in the other. The data of Inamura and Nagai also confirm that an increase in liquid viscosity leads to coarser atomization, regardless of air velocity.

Actual catalyst droplet size can also be controlled through the use of a dilation control device on the orifice. Such a device would allow for the expansion or contraction of the orifice size to regulate drop size. This control can be effected in-line, manually or automatically. In any case, each droplet, on formation, has a temperature in the range of about 20 to about 120 degrees C., and preferably a temperature in the range of about 50 to about 100 degrees C., and most preferably in the range of about 60 to about 90 decrees C. The weight ratio of the carrier gas to the liquid solvent in the droplet, on formation of the droplet at or near the nozzle tip, can range from the weight ratio of carrier gas to liquid solvent added to the system, typically ranging from about 0.15:1 to about 6:1 gas to liquid ratio, to essentially infinity due to evaporation of the liquid in the injection tube. It is noted that temperatures at the tip of the nozzle and within about four inches of the nozzle tip are about the same.

Control of resin particle size can be described as follows: The ultimate resin particle size in the reactor is determined by the initial catalyst droplet size, the amount of catalyst in a droplet, and by the degree of agglomeration between the droplets and resin particles in the reactor. As mentioned above, the droplet size is governed primarily by the flow rate or velocity of the atomizing gas, the gas to liquid ratio at the nozzle tip, and the ultimate viscosity of the evaporating liquid. The amount of catalyst in a droplet is governed by the amount of diluent (solvent) added to the catalyst solids, the extent of evaporation, and by the droplet size. The degree of agglomeration between droplets and particles can be influenced by the droplet size, the amount of catalyst in the particle, the catalyst activity and kinetic behavior, the droplet initial temperature, and the evaporation rate of the droplet solvent(s) in the spray. When the quantity of liquid in the spray is excessive, which will not be the case in this invention, droplets may coalesce or impact and stick to resin particles in the fluidized bed resulting in an overall increase in the resin average particle size due to agglomerative growth. As the amount of liquid progressively decreases, the droplets generally dry out to the extent that they fail to stick to resin particles in the bed, forming instead discrete new polymer particles. There can be a combination of coating of resin and new particle formation that still achieves a steady resin particle size in the fluid bed without runaway particle growth. The particle lean zone is especially helpful in achieving a stable preferred resin particle size within the range of about 0.015 to about 0.065 inch when liquid is substantially present at the nozzle tip. As the amount of liquid is further diminished and the temperature at or near the nozzle tip reaches that of the dewpoint of the solvent or above, the droplet becomes more of a solid containing adsorbed or absorbed liquid. This results in a minimum resin average particle size based upon a specified gas flow rate and gas to liquid feed ratio. Further manipulation is possible by changing the gas flow and gas to liquid ratios.

In commercial practice, the liquid stream is usually comprised of the liquid catalyst or catalyst solution, the solvent, the diluent carrier liquid, the cocatalyst, and/or optional activators. The total liquid rate is adjusted by changing the amount of diluent added to the steady flow of catalyst and cocatalyst necessary to maintain a constant polymerization rate. For the perpendicular spray nozzle, as elevated off-line, an increase in total liquid flow results in the formation of more droplets of similar size and decreased catalyst content. Even though this would be expected to result in a decrease in the resin particle size, the resulting particle size can instead increase due to coating and growth on existing resin particles.

By adjusting the droplet size and the amount of catalyst in a droplet, and manipulating the amount of liquid, if any, remaining in the spray, the final resin particle size can be controlled. An increase in the atomization rate decreases the droplet particle size and decreases the resin average particle size (APS). Depending on the conditions, the total liquid rate can be changed to either increase or decrease the final resin APS. It should be remembered, however, that in this invention, the amount of liquid is very small. Therefore, the liquid effect is minimal, and the final resin particle size is determined for the most part by the size of the droplet exiting the nozzle.

The amount of diluent fed with the catalyst and the amount of diluent vapor in the process cycle gas can be varied independently. Often, an additional stream of the solvent used to dilute the catalyst and cocatalyst can be fed directly to the process as an induced condensing agent. In this way, the relative rate of solvent evaporation can be controlled by adjusting the amount of solvent vapor in the cycle gas. When the level of induced condensing agent (ICA) is increased in the cycle gas, the evaporation rate of the droplets can decrease, which can lead to increased particle size under some conditions. In this case, the amount of solvent in the droplets can be decreased by feeding less solvent with the catalyst, and the droplet size can be decreased by feeding more atomization gas. In this way the droplets can form new stable particles more readily under the conditions of increased dew point or condensation in the cycle gas. In any case, the droplet injected in the reactor has a high solids content and a low solvent content.

The perpendicular spray nozzle can produce catalyst droplets of a desired average size (about 0.005 to 0.150 millimeter) within a narrow size distribution. The droplet size can be adjusted without disturbing the ongoing polymerization reaction by regulating liquid and gas flow rates. A narrow distribution of droplet size, from about 0.005 to about 0.150 millimeter, preferably about 0.010 to 0.0750 millimeter, can prevent the formation of large agglomerates resulting from large droplets and the formation of fines resulting from small droplets. Under many conditions, however, a wide droplet size distribution is acceptable since the smaller droplets can agglomerate to some degree with the resin in the reactor and large droplets can form larger particles of up to 0.5 centimeter, which can be readily fluidized as long as the particle fraction is low enough, preferably less than about 10 percent and more preferably less than 2 percent by weight of the total resin in the bed.

The use of this droplet size/flow rate model can be operationally linked (via computer, live operator, or other means) to specific reactor conditions and controls, which would allow control of the catalyst droplet size in relation to polymer particle size in the reactor. The polymer bulk density will decrease in the presence of the undesired larger particles. With bulk density fluctuations there are commensurate changes in the bed level and the breadth of the fluidization bands depicting the oscillations of the bed. If the resin particles are too small, they tend to accumulate in the top of the reactor and can be discerned by detecting changes in the fluidized bulk density, bed level, and high bed level. Based on such readings, appropriate changes can be made to the liquid and gas flows (or even orifice size) in the nozzle to adjust the particles to within a desired range to maintain the resin size during the course of polymerization. Such control can be accomplished separately from catalyst flow rate by controlling the diluent level. As understood by one skilled in the art, the above can be accomplished using automated control technology.

Additional control of APS can be achieved by using multiple perpendicular spray nozzles or a combination of perpendicular spray nozzles and other atomization devices, each creating a unique droplet size. The relative catalyst feed rates then can be changed to control the overall APS. Furthermore, multiple nozzles can be used to spray different catalysts of differing solvent compatibilities and particle formation tendencies to produce polymers of broad or bimodal molecular weight and comonomer distributions in a single reactor.

Any type of polymerization catalyst can be used in the present process provided it is stable; can be initially prepared in liquid form; and can be effectively sprayed when it is in droplet form with a high solids content. A single liquid catalyst or a liquid mixture of catalysts can be used. A slurry containing a supported catalyst can also be used. These catalysts can be used with cocatalysts and, optionally, activators, modifiers, and/or promoters well known in the art. Examples of suitable catalysts include:

A. Ziegler-Natta catalysts, including titanium based catalysts such as those described in U.S. Pat. Nos. 4,376,062 and 4,379,758. Ziegler-Natta catalysts typically are magnesium/titanium/electron donor complexes used in conjunction with an organoaluminum cocatalyst.

Note: Supported catalysts added with ICAs (induced condensing agents) like isopentane or mineral oil with isopentane diluents can be employed together with tip temperature and dew point control.

B. Chromium based catalysts such as those described in U.S. Pat. Nos. 3,709,853; 3,709,954; and 4,077,904.

C. Vanadium based catalysts such as vanadium oxychloride and vanadium acetylacetonate such as described in U.S. Pat. No. 5,317,036.

D. Metallocene catalysts.

E. Cationic forms of metal halides such as aluminum trihalides.

F. Cobalt catalysts such as those described in U.S. Pat. Nos. 4,472,559 and 4,182,814.

G. Nickel catalysts such as those described in U.S. Pat. Nos. 4,155,880 and 4,102,817.

H. Rare Earth metal catalysts, i.e., those containing a metal having an atomic number in the Periodic Table of 57 to 103 such as compounds of cerium, lanthanum, praseodymium, gadolinium, and neodymium. Especially useful are carboxylates, alcoholates, acetylacetonates, halides (including ether and alcohol complexes of neodymium trichloride), and alkyl derivatives of such metals. Neodymium compounds, particularly neodymium neodecanoate, octanoate, and versatate, are the most preferred rare earth metal catalysts. Rare earth catalysts are used to produce polymers of butadiene or isoprene.

Preferred among these different catalyst systems are catalyst compositions comprising a metallocene catalyst in liquid form and an activating cocatalyst. Accordingly, the catalyst composition can comprise any unsupported metallocene catalyst useful in slurry, solution, or gas phase olefin polymerization. One or more than one metallocene catalyst can be employed. For example, as described in U.S. Pat. No. 4,630,914, at least two metallocene catalysts can be used in a single catalyst composition to achieve a broadened molecular weight distribution polymer product.

Metallocene catalysts are organometallic coordination complexes of one or more π-bonded moieties in association with a metal atom from Groups IIIB to VIII or the rare earth metals of the Periodic Table.

Bridged and unbridged mono-, bis-, and tris-cycloalkadienyl/metal compounds are the most common metallocene catalysts, and generally are of the formula:

$$(L)_y R^1_z (L')MX_{(x-y-1)} \quad (I)$$

wherein M is a metal from groups IIIB to VIII of the Periodic Table; L and L' are the same or different and are π-bonded ligands coordinated to M, preferably cycloalkadienyl groups such as cyclopentadlienyl, indenyl, or fluorenyl groups, optionally substituted with one or more hydrocarbyl groups containing 1 to 20 carbon atoms; $R^1$ is a substituted or unsubstituted alkylene radical having 1 to 4 carbon atoms, a dialkyl or dliaryl germanium or silicon, or an alkyl or aryl phosphine or amine radical bridging L and L'; each X is independently hydrogen, an aryl, alkyl, alkenyl, alkylaryl, or arylalkyl radical having 1 to 20 carbon atoms, a hydrocarboxy radical having 1 to 20 carbon atoms, a halogen, $R^2CO_2—$, or $R^2{}_2NCO_2—$, wherein each $R^2$ is a hydrocarbyl group containing 1 to about 20 carbon atoms and can be the same or different; y is 0, 1, or 2; x is 1, 2, 3, or 4 depending upon the valence state of M; z is 0 or 1 and is 0 when y is 0; and x–y is greater than or equal to 1.

Illustrative of metallocene catalysts represented by formula I are dialkyl metallocenes such as bis(cyclopentadienyl)titanium dimethyl, bis(cyclopentadienyl) titanium diphenyl, bis(cyclopentadienyl)zirconium dimethyl, bis(cyclopentadienyl)zirconium diphenyl, bis(cyclopentadienyl)hafnium methyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl) zirconium dibenzyl, bis(cyclopentadienyl)vanadium dimethyl; mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as, pentamethylcyclopentadienyl titanium trichloride, pentaethylcyclopentadienyl titanium trichloride; bis(pentamethylcyclopentadienyl)titanium diphenyl; substituted bis(cyclopentadienyl)titanium (IV) compounds such as: bis(indenyl)titanium diphenyl or dichloride, bis(methylcyclopentadienyl)titanium diphenyl or dihalide; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride; and silicon, phosphine, amine, or carbon bridged cyclopentadiene complexes such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes as well as bridged metallocene compounds such as isopropyl(cyclopentadienyl) (fluorenyl)zirconium dichloride, isopropyl (cyclopentadienyl)(octahydrofluorenyl)zirconium dichloride, diphenylmethylene(cyclopentadienyl)(fluorenyl) zirconium dichloride, diisopropylmethylene (cyclopentadienyl)(fluorenyl)-zirconium dichloride, diisobutylmethylene(cyclopentadienyl)(fluorenyl)zirconium dichloride, ditertbutylmethylene(cyclopentadienyl) (fluorenyl)zirconium dichloride, cyclohexylidene (cyclopentadienyl)(fluorenyl)zirconium dichloride, diisopropylmethylene (2,5-dimethylcyclopentadienyl)(fluorenyl) zirconium dichloride, isopropyl(cyclopentadienyl) (fluorenyl)hafnium dichloride, diphenylmethylene (cyclopentadienyl)(fluorenyl)hafnium dichloride, diisopropylmethylene(cyclopentadienyl)(fluorenyl)hafnium dichloride, diisobutylmethylene(cyclopentadienyl)(fluorenyl)hafnium dichloride, ditertbutylmethylene(cyclopentadienyl)(fluorenyl)hafnium dichloride, cyclohexylidene(cyclopentadienyl)(fluorenyl)hafnium dichloride, diisopropylmethylene(2,5-dimethylcyclopentadienyl)(fluorenyl)hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl)(fluorenyl)titanium dichloride, diisobutylmethylene(cyclopentadienyl)(fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene(2,5 dimethylcyclopentadienyl fluorenyl)titanium dichloride, racemic-ethylene bis(1-indenyl) zirconium (IV) dichloride, racemic-ethylene bis(4,5,6,7-tetrahydro-1-indenyl)zirconium (IV) dichloride, racemic-dimethylsilyl bis(1-indenyl)zirconium (IV) dichloride, racemic-dimethylsilyl bis(4,5,6,7-tetrahydro-1-indenyl)zirconium (IV) dichloride, racemic-1,1,2,2-tetramethylsilanylene bis(1-indenyl)zirconium (IV) dichloride, racemic-1,1,2,2-tetramethylsilanylene bis(4,5,6,7-tetrahydro-1-indenyl)zirconium (IV) dichloride, ethylidene(1-indenyl tetramethylcyclopentadienyl) zirconium (IV) dichloride, racemic-dimethylsilyl bis(2-methyl-4-t-butyl-1-cyclopentadienyl)zirconium (IV) dichloride, racemic-ethylene bis(1-indenyl)hafnium (IV) dichloride, racemic-ethylene bis(4,5,6,7-tetrahydro-1-indenyl)hafnium (IV) dichloride, racemic-dimethylsilyl bis (1-indenyl)hafnium (IV) dichloride, racemic-dimethylsilyl bis(4,5,6,7-tetrahydro-1-indenyl)hafnium (IV) dichloride, racemic-1,1,2,2- tetramethylsilanylene bis(1-indenyl) hafnium (IV) dichloride, racemic-1,1,2,2-tetramethylsilanylene bis(4,5,6,7-tetrahydro-1-indenyl) hafnium (IV), dichloride, ethylidene(1-indenyl-2,3,4,5-tetramethyl-1-cyclopentadienyl)hafnium (IV) dichloride, racemic-ethylene bis(1-indenyl)titanium (IV) dichloride, racemic-ethylene bis(4,5,6,7-tetrahydro-1-indenyl)titanium (IV) dichloride, racemic-dimethylsilyl bis(1-indenyl)titanium (IV) dichloride, racemic-dimethylsilyl bis(4,5,6,7-tetrahydro-1-indenyl)titanium (IV) dichloride, racemic-1,1,2,2-tetramethylsilanylene bis(1-indenyl)titanium (IV) dichloride racemic-1,1,2,2-tetramethylsilanylene bis(4,5,6,7-tetrahydro-1-indenyl)titanium (IV) dichloride, and ethylidene(1-indenyl-2,3,4,5-tetramethyl-1-cyclopentadienyl)titanium IV) dichloride.

Particularly preferred metallocene catalysts have one of the following formulas (II or III):

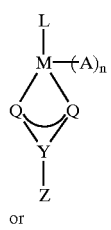

(II)

or

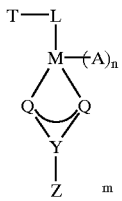

(III)

wherein:

M is a metal from groups IIIB to VIII of the Periodic Table, preferably Zr or Hf;

L is a substituted or unsubstituted, π-bonded ligand coordinated to M, preferably a substituted cycloalkadienyl ligand;

Each Q is independently selected from the group consisting of —O—, —NR$^3$—, —CR$^3_2$— and —S—, preferably oxygen;

Y is either C or S, preferably carbon;

Z is selected from the group consisting of —OR$^3$, —NR$^3_2$, —CR$^3_3$, —SR$^3$, —SiR$^3_3$, —PR$^3_2$, and —H, with the proviso that when Q is —NR$^3$— then Z is selected from the group consisting of —OR$^3$, —NR$^3_2$, —SR$^3$, —SiR$^3_3$, —PR$^3_2$, and —H, preferably Z is selected from the group consisting of —OR$^3$, —CR$^3_3$, and —NR$^3_2$;

n is 1 or 2;

A is a univalent anionic group when n is 2 or A is a divalent anionic group when n is 1, preferably A is a carbamate, carboxylate, or other heteroallyl moiety described by the Q, Y and Z combination;

each R$^3$ is independently a group containing carbon, silicon, nitrogen, oxygen, and/or phosphorus and one or more R$^3$ groups may be attached to the L substituent; preferably R$^3$ is a hydrocarbon group containing from 1 to 20 carbon atoms, most preferably an alkyl, cycloalkyl or an aryl group;

T is a bridging group selected from the group consisting of alkylene or arylene groups containing from 1 to 10 carbon atoms optionally substituted with carbon or heteroatoms, germanium, silicone and alkyl phosphine; and m is a whole number from 1 to 7, preferably 2 to 6, most preferably 2 or 3.

The supportive substituent formed by Q, Y, and Z is a uncharged polydentate ligand exerting electronic effects due to its high polarizability, similar to the cyclopentadienyl group. In the most preferred embodiments of this invention, the disubstituted carbamates,

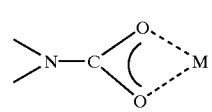

(IV)

and the carboxylates

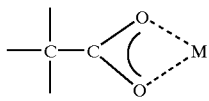

(V)

are employed.

Examples of metallocene catalysts according to formulas II and III include indenyl zirconium tris(diethylcarbamate), indenyl zirconium tris(pivalate), indenyl zirconium tris(p-toluate), indenyl zirconium tris(benzoate), (1-methylindenyl) zirconium tris(pivalate), (2-methylindenyl)zirconium tris(diethylcarbamate), (methylcyclopentadienyl)zirconium tris(pivalate), cyclopentadienyl tris(pivalate), and (pentamethylcyclopentadienyl)zirconium tris(benzoate). Preferred examples of these metallocene catalysts are indenyl zirconium tris(diethylcarbamate) and indenyl zirconium tris(pivalate).

Another type of metallocene catalyst that can be used in accordance with the invention is a constrained geometry catalyst of the formula:

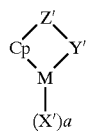

(VI)

wherein:

M is a metal of Group IIIB to VIII of the Periodic Table;

Cp is a cyclopentadienyl or substituted cyclopentadienyl group bound in an $\eta^5$ bonded mode to M;

Z' is a moiety comprising boron, or a member of Group IVB of the Periodic Table and, optionally, sulfur or oxygen, the moiety having up to 20 non-hydrogen atoms, and, optionally, Cp and Z' together form a fused ring system;

X' is an anionic ligand group or a neutral Lewis base ligand group having up to 30 non-hydrogen atoms;

a is 0, 1, 2, 3 or 4 depending on the valence of M; and

Y' is an anionic or non-anionic ligand group bonded to Z' and M, comprising nitrogen, phosphorus, oxygen, or sulfur, and having up to 20 non-hydrogen atoms, and, optionally, Y' and Z' together form a fused ring system.

Constrained geometry catalysts are well known to those skilled in the art and are disclosed in, for example, U.S. Pat. Nos. 5,026,798 and 5,055,438 and European Patent Application 0 416 815.

Illustrative but non-limiting examples of substituents Z', Cp, Y', X', and M in formula (VI) are:

| Z' | Cp | Y' | X' | M |
|---|---|---|---|---|
| dimethyl-silyl | cyclopenta-dienyl | t-butylamido | chloride | titanium |
| methyl-phenylsilyl | fluorenyl | phenylamido | methyl | zirconium |
| diphenyl-silyl | indenyl | cyclohexylamido | | hafnium |
| tetramethyl- | tetramethyl- | oxo | | |

-continued

| Z' | Cp | Y' | X' | M |
|---|---|---|---|---|
| ethylene | cyclopenta-dienyl | | | |
| ethylene diphenyl-methylene | | | | |

The invention is also useful with another class of single site catalyst precursors, di(imine) metal complexes, as described in PCT Application WO 96/23010.

The cocatalyst is a compound, which is capable of activating the metallocene catalyst. Preferably, the cocatalyst is one of the following: (a) branched or cyclic oligomeric poly(hydrocarbyl-aluminum oxide)s, which contain repeating units of the general formula —(Al(R*)O)—, wherein R* is hydrogen, an alkyl radical containing from 1 to 12 in carbon atoms, or an aryl radical such as a substituted or unsubstituted phenyl or naphthyl group; (b) ionic salts of the general formula $[A^+][BR^{}_4{}^-]$, where $A^+$ is a cationic Lewis or Bronsted acid capable of abstracting an alkyl, halogen, or hydrogen from the metallocene catalyst, B is boron, and R is a substituted aromatic hydrocarbon, preferably a perfluorophenyl radical; and (c) boron alkyls of the general formula $BR^{}_3$, where R is as defined above.

Preferably, the cocatalyst is an aluminoxane such as methylaluminoxane (MAO) or modified methylaluminoxane (MMAO), or a boron alkyl. The method of preparation of aluminoxanes is well known in the art. They can be in the form of oligomeric linear alkyl aluminoxanes represented by the formula:

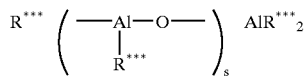

or oligomeric cyclic alkyl aluminoxanes of the formula:

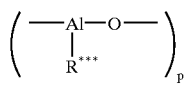

wherein s is 1 to 40, preferably 10 to 20; p is 3 to 40, preferably 3 to 20; and R* is an alkyl group containing 1 to 12 carbon atoms preferably methyl or an aryl radical such as a substituted or unsubstituted phenyl or naphthyl radical. In the case of MAO, R* is methyl, whereas in MMAO, R* is a mixture of methyl and alkyl groups having 2 to 12 carbon atoms wherein methyl comprises about 20 to 80 percent by weight of the R* group.

The amount of cocatalyst and metallocene catalyst usefully employed, whether formed in situ as they are introduced into the reaction zone or formed prior to introduction into the reaction zone, can vary over a wide range. When the cocatalyst is a branched or cyclic oligomeric poly (hydrocarbylaluminum oxide), the mole ratio of aluminum atoms contained in the poly(hydrocarbylaluminum oxide) to metal atoms contained in the metalocene catalyst is generally in the range of about 2:1 to about 100,000:1, preferably in the range of about 10:1 to about 10,000:1, and most preferably in the range of about 50:1 to about 2,000:1. When the cocatalyst is an ionic salt of the formula $[A^+][BR^*_4{}^-]$ or a boron alkyl of the formula $BR^*_3$, the mole ratio of boron atoms contained in the ionic salt or the boron alkyl to metal atoms contained in the metallocene catalyst is generally in the range of about 0.5:1 to about 10:1, preferably in the range of about 1:1 to about 5:1. R* is hydrogen, an alkyl radical containing from 1 to 12 carbon atoms, or an aryl radical such as a substituted or unsubstituted phenyl or naphthyl group.

The liquid catalyst can be comprised of one or more metal complexes in combination with one or more cocatalysts. The complex and the cocatalyst can be referred to as the catalyst system. Alternatively, all or a portion of the cocatalyst can be fed separately to the reactor. Promoters associated with any particularly polymerization are usually added to the reactor separately from the cocatalyst and/or metal complexes, but can be added with the catalyst system.

Metal complexes, which occur naturally in liquid form are not candidates for this invention unless they can be converted to a catalyst composition, which will be at least about 95 percent solids. It may be that such liquid catalysts can be supported on the cocatalyst as it dries to a solid or semi-solid and thus become a candidate. If the cocatalyst occurs naturally in liquid form, it can be introduced "neat" into the particle-lean zone (or the fluidized bed). As used herein, "liquid catalyst" or "liquid form" include neat solutions, emulsions, colloids, suspensions, dispersions, and slurries of the catalyst complex with or without the cocatalyst in the initial stage, i.e., as introduced into the nozzle or injection tube, but, as noted, each must be capable of conversion to at least about 95 percent solids.

The solvents which can be utilized to form liquid catalysts are inert solvents, preferably non-functional hydrocarbon solvents, and can include aliphatic hydrocarbons such as butane, isobutane, ethane, propane, pentane, isopentane, hexane, heptane, octane, decane, dodecane, hexadecane, and octadecane; alicyclic hydrocarbons such as cyclopentane, methylcyclopentane, cyclohexane, cycloctane, norbornane, and ethylcyclohexane; aromatic hydrocarbons such as benzene, toluene, ethylbenzene, propylbenzene, butylbenzene, xylene, and tetrahydrofuran; petroleum fractions such as gasoline, kerosene, and light oils; and mineral oil. Likewise, halogenated hydrocarbons such as methylene chloride, chlorobenzene, and ortho-chlorotoluene can also be utilized. By "inert" is meant that the material being referred to is non-deactivating in the polymerization reaction zone under the conditions of gas phase polymerization and is non-deactivating insofar as the catalyst is concerned in or out of the reaction zone. By "non-functional", it is meant that the solvents do not contain groups such as strong polar groups, which can deactivate the active catalyst metal sites.

As an example of some solvent characteristics: Inclusion of solvents heavier than isopentane increase the dewpoint of the droplet at the tip of the nozzle from 52 to 58 degrees C. for a 2.4 gas to liquid ratio, from 66 to 71 degrees C. for a 1.5 gas to liquid ratio, and from 88 to 92.5 degrees C. for a 0.75 gas to liquid ratio. Some solids/solvent mixtures that are sprayed dry with isopentane solvent would be wet with heavier solvents. Mixtures that are sprayed wet with isopentane solvent contain a higher fraction of liquid when heavier solvents are used. Inclusion of MMAO in the mixture would be expected to further increase the dewpoint at the tip.

The concentration of the catalyst and/or cocatalyst that is in solution and is provided to, for example, the feed (inlet) portion of the catalyst injection tube, can be as high as the saturation point of the particular solvent being used. In this injection tube, the solvent evaporates to the extent desired, and solids are formed containing some or essentially no solvent. The injection tube then injects or sprays the catalyst/cocatalyst into the reactor. Preferably, the concentration of the catalyst and/or cocatalyst in the solvent, initially, is in the range of about 0.01 to about 10,000 millimoles per liter. Liquid flow rates of catalyst, solvent, cocatalyst, and activators range from about 5 to about 250 kilograms per hour for commercial scale gas-phase reactors. The flow rates of the solids/solvent mixture containing at least about 95 percent by weight solids can be in the range of about 0.25 to about 12.5 kilograms per hour.

The gases, which can be used in the spray nozzles (injection tubes), can be any of those relatively inert to the catalyst so that there is no blockage in the nozzle. Examples of gases are $N_2$, Ar, He, $CH_4$, $C_2H_6$, $C_3H_8$, $CO_2$, $H_2$, and cycle gas. Reactive gases (e.g., olefins) can be used if the catalyst is activated in the reactor, e.g., where the cocatalyst is fed separately. The gas flow rates in the nozzle can be between about 0.5 and about 200 kilograms per hour depending upon the reactor size and particle size control discussed above.

The spray nozzles can also be used to deliver non-catalytic in liquids or solids or liquid/solid mixtures to the reactor, e.g., solvents, anti-fouling agents, scavengers, monomers, antistatic agents, secondary alkyls, stabilizers, and antioxidants. Some specific examples include methanol, veratrole, propylene oxide, glyme, water, antistatic agents, hydrogen, metal alkyls of the general formula $M^3R^5g$ wherein $M^3$ is a Group IA, IIA or IIIA metal, $R^5$ is an alkyl or aryl, and g is 1, 2, or 3; zinc alkyls; $CHCl_3$; $CFCl_3$; $CH_3CC_{l_3}$; $CF_2ClCCl_3$; ethyltrichloroacetate; and aluminum alkyls, most preferably triisobutylaluminum. The addition of these additives can be anywhere in the reactor, e.g., to the bed, beneath the bed, above the bed, or to the cycle line, and the use thereof is well within the skill of the art. These additives can be added to the reaction zone separately or independently from the catalyst if they are solids, or as part of the catalyst, provided that they do not interfere with the desired atomization. To be part of the catalyst solution, the additives should be liquids or capable of being dissolved in the catalyst solution, but they also have to be capable of being retained in the high solid, low solvent mixture.

Preferably, the nozzles (injection tubes) used will withstand high pressures (up to 4200 kPa), temperatures (up to 300 degrees C.), and a harsh chemical environment (e.g., aluminum alkyls or HCl.), and will deliver the spray at elevated pressures (up to 3500 kPa). They also should be capable of easy and safe introduction and removal from a reactor without interrupting the reactor operation. Those nozzles selected for use should not be easily plugged by suspended solid contaminants and should not allow backflow of reactive monomer.

The avoidance of fouling the reactor by the polymer can be accomplished through the use of a deflecting gas, i.e., a gas that is used to reduce the resin density at or near the nozzle entrance, which allows the catalyst to enter the reactor in a particle-lean zone, i.e., an area substantially free from polymer. If this deflecting gas flows past the orifice of the nozzle, it will sweep away any resin, keeping the orifice clear. How such a deflecting gas can be configured is disclosed in U.S. patent application Ser. No. 08/659,764 U.S. Pat. No. 5,693,727. In a preferred embodiment of the present invention, the liquid catalyst in a carrier gas (e.g., nitrogen, argon, alkane, or mixtures thereof is surrounded by at least one particle-deflecting and/or tip-cleaning gas such as recycle gas, monomer gas, chain transfer gas (e.g., hydrogen), inert gas, or mixtures thereof. Preferably, the particle-deflecting gas is all or a portion of recycle gas and the tip-cleaning gas is all or a portion of a monomer (e.g., ethylene or propylene) employed in the process.

The nozzle can be constructed of any material which is not reactive under the selected polymerization conditions including, but not limited to, aluminum, aluminum bronze, Hastalloy™, Inconel™, Incoloy™, Monel™, chrome carbide, boron carbide, cast iron, ceramic, copper, nickel, silicon carbide, tantalum, titanium, zirconium, tungsten carbide, as well as certain polymeric compositions. Particularly preferred is stainless steel. The distal end of the nozzle can be of any geometric configuration, e.g., bulbous, rounded, parabolic, conical, rectangular, or semi-circular, but, to limit turbulence, the nozzle preferably is tapered at about 5 to 15 degrees off horizontal (the central axis of the tube). Higher taper angles can be tolerated given that the taper from the horizontal is gradual. A tapered tip also minimizes fouling because of the small area available for accumulation of catalyst and polymer. Commercial wide-angle spray nozzles usually require large tips to increase the spray angle. Such wide tips can provide a large area for unacceptable accumulation of catalyst and polymer in a gas-phase fluidized bed reactor. A wide angle spray can be achieved, however, from a nozzle with a fine tapered tip. As stated above, the nozzle can have many different configurations. This can include an orifice having a rotary design or a nozzle having rifling to impart a spin to the liquid. An ultrasonic nozzle has a piezo-electric crystal which can be automatically controlled to effect changes in particle size.

An example of a nozzle is a standard pneumatic perpendicular spray nozzle, as described in U.S. Pat. No. 6,075,101, which is simply a tapered tube. In this nozzle, the solids and diluent are carried down the central axis of the tube with an optional atomization gas. Some small droplets are suspended in this gas flow and exit the nozzle at the tapered end through one to three orifices at least one of which is at least 10 to 20 degrees, preferably 20 to 60 degrees, and most preferably 60 to 90 degrees off from the central axis of the tube. Liquid which is not vaporized in the catalyst injection tube, for the most part, passes down the tube as a film on the wall or in a liquid slug. These slugs or films are atomized to a fine spray as the carrier gas is forced through the orifices. The nozzle can be designed with one or more orifices. The orifices can be drilled in the tapered section or in the cylindrical section, and optionally, additional orifices can be drilled at the tip. Hole diameter can be designed for a given range of droplets containing at least about 95 percent solids and for droplets, which are essentially solids. Best results have been obtained with the gas (including the vaporized liquid) to droplet mass flow ratio between about 20:1 to about 150:1, preferably between about 25:1 to about 125:1. The diameters are designed so that the gas superficial exit velocity is between about 4 and about 100 meters per second (m/s), preferably between 9 and 75 m/s, and most preferably between 14 and 40 m/s. The individual orifice size is not critical, rather total surface area of the orifices is the determining factor. A hole at the end of the nozzle tip is optional. Its purpose is to allow a stream of gas to flow out at the tip, thus preventing a stagnant zone at the tip. In one example, one or more holes are situated along the side of the nozzle taper and there is no hole at the end of the nozzle tip which is instead cut-off approximately perpendicular to the central axis of the nozzle, at a point just after the hole(s) on the tapered edge Many variations on the nozzle geometry can be used. For example, slots perpendicular to the axis of the tube of about 1 millimeter (mm)×3 mm can be used instead of holes for the orifices. Slots can be cut perpendicularly to the tube along the axis of the cylindrical section near the tip or on the tapered section. Or a slot can be made which runs across the end of the tip.

Conventional means for delivering the liquid and gas to the nozzle are provided. These are connected to the inlet end of the nozzle.

The tube diameter can range from about ⅛ inch (3.175 mm) to ½ inch (12.7 mm). The orifice can be between about 0.25 mm to 6 mm, preferably between about 1.5 mm and 3 mm. The tip of the nozzle is typically located within a jet of tip-cleaning gas of 450 to 1400 kilograms per hour of heated monomer, which, in turn, is located within a jet of cycle gas of 4,000 to 30,000 kilograms per hour for commercial plants.

Another example of a nozzle is a perpendicular effervescent nozzle wherein there is an inner tube within a concentric outer tube. The liquid is carried through the annular space between the tubes and a gas is carried through the inner tube. Alternatively, the liquid can be fed through the inner tube and the gas through the annulus. Liquid and gas are fed separately through the inlets of the nozzle. Because the gas and liquid do not mix until near the nozzle tip, there is reduced or essentially no evaporation of the liquid until that point. There are small holes in the inner tube near the spray tip which allow the gas to contact the liquid prior to the liquid reaching the orifice. The spray tip of the outer tube is tapered as above. Again, there is at least one orifice toward the distal end of the outer tube where the orifice is at least 10 to 20 degrees, preferably 20 to 60 degrees and most preferably 60 to 90 degrees off from the central axis of the tube. It is preferred that the gas of the nozzle be fed into the inner tube and the liquid catalyst in the outer tube, both being fed in the same direction, flowing towards the orifices. The gas forms bubbles in the liquid as it exits through holes in the inner tube and forces the liquid to the outer walls of the outer tube. Thus, as the small amount of liquid, if any, exits through the orifices, the gas is assisting in spreading out the liquid.

Illustrative of the polymers which can be produced in accordance with the invention are the following: polyolefins generally, and more specifically, polyethylene and polypropylene including ethylene homopolymers and ethylene copolymers employing one or more $C_3$ to $C_{12}$ alpha-olefins and propylene homopolymers and propylene copolymers employing one or more $C_2$ and/or $C_4$ to $C_{12}$ alpha-olefins; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; and polychloroprene.

The process of the present invention is carried out in the gas phase in a fluidized bed reactor or two or more fluidized bed reactors connected in series. Conventional gas-phase polymerization processes including condensing mode and liquid monomer techniques can be employed.

A conventional fluidized bed process for producing resins is practiced by passing a gaseous stream containing one or more monomers continuously through a fluidized bed reactor under polymerization conditions in the presence of a polymerization catalyst. Product is withdrawn from the reactor. A gaseous stream of unreacted monomer is withdrawn from the reactor continuously and recycled into the reactor along with make-up monomer added to the recycle stream.

Condensing mode polymerizations are described in U.S. Pat. Nos. 4,543,399; 4,588,790; 5,352,749; and 5,462,999. Also, see U.S. Pat. Nos. 5,834,571; 6,096,840; 5,453,471; 6,063,877; 5,436,304; 5,405,922; and 5,352,7409. These condensing mode processes are employed in fluidized bed polymerizations to achieve higher cooling capacities and, hence, higher reactor productivity. Typically, a recycle stream is cooled to a temperature below the dew point resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid can be inert to the catalyst, reactants, and the polymer product produced, but it can also include monomers and comonomers. In addition to condensable fluids from the polymerization process itself, other condensable fluids, inert to the polymerization can be introduced to "induce" condensing mode operation. Examples of suitable condensable fluids can be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof.

Condensable fluids can also include polymerizable condensable comonomers such as olefins, alpha-olefins, diolefins, diolefins containing at least one alpha-olefin, and mixtures thereof In the condensing mode, it desirable that the liquid entering the fluidized bed be dispersed and vaporized quickly.

Liquid monomer polymerization is disclosed in U.S. Pat. No. 5,453,471; and PCT patent applications WO 95/09826 and WO 95/09827. When operating in the liquid monomer mode, liquid can be present throughout the entire fluidized bed provided that the liquid monomer present in the bed is adsorbed on or absorbed in solid particulate matter present in the bed such as polymer being produced or fluidization aids (e.g., carbon black) so long as there is no substantial amount of free liquid monomer present more than a short distance above the point of entry into the polymerization zone. Typically, the temperature within the zone and the velocity of gases passing through the zone are such to accomplish this. Liquid mode makes it possible to produce polymers in a gas phase reactor using monomers having condensation temperatures much higher than the temperatures at which conventional polyolefins are produced. In general, the liquid monomer process is conducted in a stirred bed or gas fluidized bed reaction vessel having a polymerization zone containing a bed of growing polymer particles. The process comprises continuously introducing a stream of one or more monomers and, optionally, one or more inert gases or liquids into the polymerization zone; continuously or intermittently introducing a polymerization catalyst into the polymerization zone; continuously or intermittently withdrawing polymer product from the polymerization zone; continuously withdrawing unreacted gases from the zone; and compressing and cooling the gases while maintaining the temperature within the zone below the dew point of at least one monomer present in the zone. If there is only one monomer present in the gas-liquid stream, at least one inert gas is preferably present.

Advantages of the invention are achieved by spraying droplets containing at least about 95 percent solids, which can contain a catalyst, a cocatalyst, and other additives into one or more fluidized bed reactors as described above, and preferably spraying such droplets, which are in the essentially solid or dry mode. The advantages are as follows: improved control of the polymer resin morphology, resin particle size and particle size distribution; formation of new resin particles in the fluid bed without agglomerate growth; reduction of the deflecting gas flow; operation without a particle deflecting gas; and, improved resin morphology under condensing mode operation.

All molecular weights are weight average molecular weights unless otherwise stated.

Patents, patent applications, and publications mentioned in this specification are incorporated by reference herein.

The invention is illustrated by the following examples.

EXAMPLES 1 to 9

Example 1

The reactor used in this example is a commercial reactor such as the one described in U.S. Pat. No. 5,693,727 with a catalyst delivery system comprising a particle-deflecting gas tube enclosing a tip-cleaning gas tube, which, in turn, encloses a catalyst injection tube. Methyl cyclopentadienyl zirconium tripivalate catalyst is used as a 2 weight percent solution in purified n-hexane. It is fed into the reactor at about 1.8 pounds per hour and is mixed with a stream of 1-hexene flowing at 0.8 pound per hour. 7.1 weight percent aluminum in the form of MMAO (methyl aluminoxane modified with isobutyl groups) in isopentane is then mixed with this catalyst/hexane/hexene stream for 45 to 60 minutes at 0 degrees C. The MMAO cocatalyst feed rate is adjusted so that the molar ratio of Al to Zr is 200:1. This usually requires 6 pounds per hour of MMAO solution. The solution of catalyst/cocatalyst/hexane/isopentane/hexene is further diluted to a total of 25 pounds per hour of total liquid with approximately 16 pounds per hour of isopentane. The solution is then mixed with 60 pounds per hour of nitrogen and conveyed through a one quarter inch injection tube to a perpendicular spray nozzle located in the fluidized bed of polymer product at a height of 8 feet above the distributor and extending horizontally into the reactor about 2 to 4 feet. The injection tube enters approximately perpendicular to the external reactor wall and is pointed towards the radial center of the reactor. The nozzle tip is surrounded by tip-cleaning and particle-deflecting gas flows. The tip-cleaning gas is a 2,500 pph (pounds per hour) flow of heated ethylene delivered at the nozzle tip via a ¾ inch support tube surrounding the ¼ inch injection tube. The particle deflecting or plenum gas is a 25,000 pph flow of recycle gas.

A 0.02 inch thermocouple is located on the inside of the injection tube, about three inches upstream from the nozzle. It allows measurement of the nitrogen/liquid mixture just before the mixture is sprayed through the nozzle. The thermocouple is sheathed in stainless steel and has a total length of about 10 feet. It is threaded through a Buffalo-Conax™ compression packing from outside the reactor and down the length of the ¼ inch injection tube to a point about two to three inches from the nozzle tip. It provides a measure of the temperature of the solids/solvent mixture leaving the nozzle. A second 0.02 inch thermocouple in the injection tube is located outside the reactor vessel just after the gas carrier mixes with the catalyst and solvent to measure its temperature prior to entering the coaxial tubes of the tip-cleaning and particle-deflecting gases.

A series of examples (referred to as runs) is run under similar conditions, i.e., 230 to 240 psia ethylene; 0.04 molar ratio C6/C2 (1-hexene to ethylene); 500 to 700 ppm hydrogen; and 75 degrees C. The nitrogen rate is maintained at 60 pounds per hour and the total liquid feed rate is kept at 25 pounds per hour providing a gas to liquid feed weight ratio of 2.4. During the course of the examples, the ethylene temperature passing through the ¾ inch support tube (and surrounding the ¼ inch catalyst injector tube) is changed so that the temperature of the catalyst system solids and carrier gas exiting the nozzle is also changed. The resulting particle size is found to vary. Thus, the average particle size (APS) can be controlled by adjustment of the temperature of the mixture in droplet form exiting the spray nozzle. Variables and results are found in the following Table I.

TABLE I

| Runs | Droplet Temperature (degrees C.) | APS Response | Resin Bulk Density Response |
|---|---|---|---|
| 1 | 82 | steady at 0.039 inch | steady at 19 lb/ft3 |
| 2 | 93 | increases from 0.035 inch to 0.043 inch and continues trending upward | increases from 19 lb/ft3 to 22 lb/ft3 and continues trending upward |
| 3 | 74 | decreases from 0.043 inch to 0.0355 inch and continues trending downwards | remains at about 21.5 lb/ft3 |
| 5 | 20 | increases from 0.0355 inch to 0.042 inch and continues trending upward | decreases from 21.5 lb/ft3 to 19 lb/ft3 and continues trending downwards |

The resin settled bulk density is also found to vary with the tip temperature from 20 to 93 degrees C. following an unusual response in that it initially increased with increasing temperature, then decreased and then increased again. The vapor-liquid equilibrium of the catalyst and carrier flows for the runs are as follows. For runs 1, 2, and 3, the hexane/isopentane/hexene are all gaseous at the nozzle tip and the catalyst and MMAO are essentially solids. All the liquid is evaporated and exits the nozzle with varying degrees of superheat relative to the 59 degree C. dewpoint temperature that corresponds to the minimum temperature at which all the liquid is vaporized. The measured nozzle tip temperature is about 82 degrees C. for run 1, about 93 degrees C. for run 2 and about 74 degrees C. for run 3. For run 5, the tip temperature is 20 degrees C. and the fluid exiting the nozzle is a mixture of liquid and gas. The vapor-liquid equilibrium of the mixture is calculated based on its composition and temperature. The weight fraction of liquid not evaporated is 70 percent and is comprised of a hexane and 1-hexene enriched composition of isopentane with MMAO and catalyst in the solution. The fraction of total liquid not evaporated would be 86 percent at a 0 degree nozzle temperature, 79 percent at 10 degrees C., 58 percent at 30 degrees C., 42 percent at 40 degrees C., 22 percent at 50 degrees C. and 0 percent at 58 degrees C.

The same reactor is run under similar conditions, and the tip temperature, i.e., temperature of the droplet at the tip of the nozzle, is increased to 100 degrees C. At this point, it is noticed that the resin bulk density increases to 27 pounds per cubic foot. The bulk density is usually in the range of about 18 to about 25 pounds per cubic foot. Thus, it appears that the bulk density can be increased by increasing the tip temperature to higher levels. This temperature either concentrates the catalyst in the droplets so that the droplets form essentially solid dense particles; increases the initial catalyst activity facilitating solid particle formation; or a portion of the resin that is pulled into the ethylene tip gas briefly melts or softens so that the particle voids are filled in. The unusual decrease in bulk density at intermediate temperatures can also be attributed to similar effects or the presence of liquid (possibly a high viscosity slurry due to the MMAO)

Based on a 2.4 gas to liquid feed ratio, the saturation temperature of the liquid components (catalyst, 1-hexene, hexane, and isopentane) in the nitrogen is estimated to be about 59 degrees C. Runs 1, 2, and 3 deliver the catalyst to the reactor essentially dry and free from solvent (although the MMAO can exist as a viscous liquid) with different degrees of super heat. Operation in run 3 with a tip temperature of 74 degrees C. (closest to the saturation temperature) can provide the small increase in resin bulk density. The bulk density in run 1 with a tip temperature of 82 degrees C. possibly decreases due to less residual solvent. In run 2 with a tip temperature of 93 degrees C., softening of the resin or kinetic effects can cause the bulk density to increase again. Such effects can be independent of the resin APS and particle size distribution.

Run 5 delivers a two phase fluid of gas and liquid to the reactor with only about 30 percent by weight of the liquid evaporated, i.e., 17.5 pounds per hour of liquid and 67.5 pounds per hour of total gas (nitrogen and vaporized liquid). The presence of the liquid as well as the particle size and distribution of the atomized spray contribute to the resulting resin particle size and bulk density.

Run 4 (not listed in the Table) is conducted at the specified reaction conditions and nitrogen, isopentane, hexane, 1-hexene and catalyst flow rates, but is too brief to obtain meaningful resin APS and bulk density data. The ethylene shroud temperature is about 45 degrees C. and the resulting tip temperature is about 40 degrees C. Approximately 42 percent by weight of the added liquid is present when the mixture is sprayed at the nozzle tip.

Example 2

Contact between streams of isopentane and nitrogen results in rapid evaporation of the isopentane until the nitrogen is saturated. When 1 pound per hour of isopentane and 60 pounds per hour of nitrogen (both initially at 20 degrees C. and 270 psig) are mixed, the temperature drops to 15 degrees C. because all of the isopentane is evaporated. The temperature continues to drop as the mixture becomes richer in isopentane, reaching 2 degrees C. when the nitrogen is saturated with 4 pounds per hour of isopentane. Additional isopentane does not flash and the mixture temperature increases slowly, reaching about 3 degrees C. at 10 pounds per hour of isopentane. The molar vapor fraction (moles of mixture that are vapor) is 1.0 at from 0 to 4.0 pounds per hour of isopentane, and slowly decreases as the liquid condenses.

This demonstrates that the temperature at the nozzle tip should decrease steadily as the liquid feed rate is increased until saturation is reached. Saturation can represent the lowest tip temperature and further increases in solvent only slightly increase the tip temperature above saturation.

Example 3

Solvent evaporation begins when the solution catalyst contacts the nitrogen atomization gas in the nozzle injection tube. The solution catalyst is the same as in Example 1, i.e., catalyst, hexane, 1-hexene, isopentane, and MMAO in the stated proportions at about 20 degrees C. after initially mixing with the nitrogen. The nozzle or injection tube is inserted into the reactor in a ¾ inch support tube. A stream of approximately 2500 pounds per hour of heated ethylene is passed through the support tube. The solution catalyst and nitrogen are heated by as much as 80 degrees C. by the time they reach the nozzle tip. With a saturation temperature of 59 degrees C., much, if not all, of the isopentane, 1-hexene, and hexane evaporate in the injection tube before the catalyst mixture exits the nozzle. Part of the tube at the beginning contains solvent and a portion of the tube near the nozzle is substantially free of solvent. At some point in the tube, the gas is saturated. At later points, the gas is superheated. The evaporative two phase boiling of the liquid and gas can cause the tip to sputter liquid due to the surge of gas in the tube or sometimes incomplete evaporation of the liquid.

Example 4

Prior to feeding the solution catalyst of example 1 into the reactor, nitrogen and isopentane are mixed and fed to the reactor through the nozzle. The reactor contains a resin seed bed and is under a pressure of 270 psig and at an initial temperature of 75 degrees C. 2500 pounds per hour of ethylene are fed into the reactor through a support tube (see example 1). The ethylene temperature is controlled at approximately 87 or 112 degrees C.

Case 1

The tip temperature reaches 103.5 degrees C. for 30 pounds per hour of nitrogen with 10 pounds per hour of isopentane and with the ethylene temperature at 112 degrees C. Essentially all of the isopentane is vaporized. As the isopentane rate is increased to 30 pounds per hour while maintaining the nitrogen rate at 30 pounds per hour, the tip temperature decreases to 87 degrees C. Under these conditions, essentially all of the isopentane is also vaporized. The nitrogen reaches saturation with 35 pounds per hour of isopentane at 84 degrees C. At 40 pounds per hour of isopentane, the tip temperature decreases to 81.4 degrees C. and 27 percent by weight of the isopentane remains liquid. At 60 pounds per hour of isopentane and 30 pounds per hour of nitrogen, the tip temperature is 81.7 degrees C. and 51 percent by weight of the isopentane remains liquid.

The temperature profiles result from two-phase boiling heat transfer. The onset of nitrogen saturation and two phase flow can be detected by rapid oscillations of about plus or minus 1 to 3 degrees C. in the tip temperature. These oscillations do not occur as long as essentially all or most of the isopentane is evaporated. It is believed that the oscillations result from liquid slugging in the nozzle and are small when only a small amount (less than 20 to 30 weight percent) of the original liquid remains. Oscillations appear to increase in amplitude as more liquid is present at the nozzle tip.

Case 2

A similar profile is obtained with the ethylene temperature at 87 degrees C. At 30 pounds per hour of nitrogen and 10 pounds per hour of isopentane, essentially all of the isopentane is vaporized and the tip temperature is 82.7 degrees C. Increasing the isopentane rate to 20 pounds per hour decreases the tip temperature to 72.5 degrees C. and essentially all of the isopentane is vaporized. At 25 pounds per hour of isopentane, the tip temperature is 69.9 degrees C. and 20 percent by weight of the isopentane remains liquid. At 30 pounds per hour of isopentane, the tip temperature is 69.1 degrees C. and 35 percent by weight of the isopentane remains liquid. At 40 pounds per hour of isopentane, the tip temperature is 71.4 degrees C. and 48 percent by weight of the isopentane remains liquid. The tip temperatures are stable when essentially all of the isopentane is evaporated and/or superheated similar to the 112 degrees C. ethylene experience. However, the tip temperatures exhibit less oscillation at saturation and when liquid is present at 87 degrees C. ethylene compared to 112 degrees C. ethylene on the support tube.

Case 3

Additional experiments are conducted at the 112 degrees C. ethylene condition to determine the effect of decreasing the nitrogen flow rate. With the isopentane at 30 pounds per hour, the nitrogen is adjusted to 15 pounds per hour. The tip temperature is 90 degrees C. and 34 percent by weight of the isopentane remains liquid. This compares to the earlier case with 30 pounds per hour of nitrogen in which essentially all of the isopentane is vaporized: 10 pounds per hour liquid at 90 degrees C. at the nozzle tip vs. essentially no liquid present (dry) at 87 degrees C. as a consequence of a small reduction in the nitrogen rate.

Based on these examples, it is clear that a small change in the nitrogen and/or liquid feed rates as well as the temperature of the fluid in the support tube can have a dramatic effect on the nozzle spray performance. The spray can easily change from "dry" to "wet," greatly affecting resin morphology and catalyst performance. An understanding of the conditions at the nozzle tip is imperative in quantifying the spray behavior of the nozzle.

Through the control of the nitrogen and isopentane feed rates and the temperature of the ethylene on the tip-cleaning support tube, it is possible to control the temperature at the nozzle tip and the nature of the fluid exiting the nozzle, whether dry, wet, saturated, or superheated, and to control the vapor-liquid composition.

Example 5

For 60 pounds per hour of nitrogen and 30 pounds per hour of total liquid in the liquid system referred to in example 3, the gas to liquid weight ratio is 2. When the nozzle temperature is 54 degrees C., the liquid solvent at the nozzle tip to total solvent weight ratio is only 0.23 so that 23.1 pounds per hour of solvent evaporate and 6.9 pounds per hour remain in the liquid state.

The flow of gas at the nozzle tip is 83.1 pounds per hour and is enriched in isopentane, hexane, and 1-hexene. The gas to liquid weight ratio at the tip is 12.0 compared to 2.0 at the beginning of the injection tube. Viscosity, density, composition, and surface tension, as well as the temperature and pressure of the liquid and gas, are significantly different at the nozzle tip compared to what is fed into the injection tube. These parameters greatly influence the performance of the spray nozzle and affect the resulting resin average particle size, particle size distribution, resin morphology, and resin bulk density.

Example 6

Example 5 is repeated except that the entering gas to liquid weight ratios are 2.4, 1.5, and 0.75. Calculating the dew point including the heavier solvents hexane and 1-hexene compared to isopentane alone, the dew point at the tip increases from 52 to 58 degrees C. for the 2.4 ratio; from 66 to 71 degrees C. for the 1.5 ratio; and from 88 to 92.5 degrees C. for the 0.75 ratio.

The flow and temperature conditions used during Example 6 are as follows. During operation in the "wet mode" when liquid is clearly leaving the tip of the nozzle, correlations developed in a cold model provide an estimate of the droplet size. As the solvent evaporates, the viscosity of the mixture increases dramatically, and it is expected that the droplet diameter would increase with the viscosity resulting in an increase in the resin particle size.

Example 7

As the solvents evaporate in the catalyst injection tube and nozzle, the remaining liquid becomes richer in the higher boiling hexane and 1-hexene. For example, in the case of 60 pounds per hour of nitrogen; 1.9 pounds per hour of hexane; 0.836 pound per hour of 1-hexene; and 22.28 pounds per hour of isopentane, the results are that the weight fraction of isopentane decreases from 0.877 to 0.733; the fraction of hexane increases from 0.085 to 0.194; and the fraction of 1-hexene increases from 0.037 to 0.073.

This enrichment in hexane and 1-hexene affects the evaporative cooling of the newly formed catalyst droplet, its minimum temperature as it dries, as well as mass transfer, diffusion effects, and swelling of the polymer particle in its early stages of development, affecting the resulting resin particle morphology, size and distribution.

Example 8

The reaction conditions and data from Example 1 are reexamined. Variables and results are set forth in Table II.

greater than 23 pounds per cubic foot (lbs/cu ft) at 93 degrees C. tip temperature. Tip temperatures up to about 97 to 100 degrees C. have resulted in bulk densities greater than 27 lbs/cu ft.

The significance of these examples is that an action such as changing the liquid or gas feeds to the nozzle can have unpredictable effects on the resin APS and bulk density without the knowledge of the physical state at the nozzle tip. By knowing the state of the fluid at the tip, gas and liquid flows can be manipulated for resin morphology control.

Example 9

A zirconium metallocene catalyst as a 0.02 M solution in toluene is mixed upstream of the catalyst injection tube with modified methylaluminoxane (MMAO) cocatalyst solution in isopentane. Additional amounts of isopentane and/or hexane are added to dilute the mixed catalyst/MMAO solution and control the gas/liquid ratio at the tip of a tapered single-hole atomizing nozzle. The Al/Zr mole ratio ranges from 300 to 700.

The combined catalyst and cocatalyst feeds are sprayed into a gas phase fluidized bed polymerization reactor using a capillary injection tube surrounded by a support tube and a 1 inch cycle gas purge flow. The capillary injection tube is comprised of 1/8 inch tubing connected to a 0.055 inch i.d.

TABLE II

| Run | Run Time (hours) | Ethylene Heat Exchanger (° C.) | Support Tube Ethylene Temp. (° C.) | Injection Tube Tip Temp (° C.) | Carrier Nitrogen (lbs/hr) | Total Catalyst Liquid Feed (lbs/hr) | Gas to Liquid Feed Weight Ratio | Liquid at Tip (wt. %)* | APS (in) | Resin Bulk Density (lb/ft3) |
|---|---|---|---|---|---|---|---|---|---|---|
| 1 | 79 | 115 | 101 | 82 | 60 | 25 | 2.4 | 0 | 0.039 | 19.0 |
| 2 | 14 | 125 | 113 | 93 | 60 | 25 | 2.4 | 0 | 0.043 | 23.0 |
| 3 | 16 | 105 | 92 | 74 | 60 | 25 | 2.4 | 0 | 0.0355 | 21.5 |
| 4 | 6 | — | 44 | 40 | 60 | 25 | 2.4 | 42 | — | — |
| 5 | 9 | — | 17 | 20 | 60 | 25 | 2.4 | 70 | 0.042 | 18.0 |
| 6 | 21 | 102 | 90 | 61 | 60 | 40 | 1.5 | 23 | 0.035 | 21.7 |
| 7 | 19 | 120 | 107 | 71 | 60 | 40 | 1.5 | 0 | 0.038 | 21.0 |
| 8 | 12 | 120 | 107 | 76 | 30 | 40 | 0.75 | 40 | 0.035 | 21.5 |
| 9 | 7 | 120 | 108 | 87 | 60 | 25 | 2.4 | 0 | — | — |
| 10 | 12 | 105 | 93 | 76 | 60 | 25 | 2.4 | 0 | 0.034 | 21.3 |

Notes to Table II:
*With respect to Liquid at Tip, the value of zero means essentially zero.
Ethylene Heat Exchanger = Temperature on the heat exchanger for the ethylene supply to the catalyst support tube.

The temperature of the catalyst fluid is measured using a thermocouple inserted coaxially inside the catalyst injection tube to a location about 2 to 3 inches from the nozzle tip. The liquid of the tip is calculated from the measured temperature and the catalyst liquid/nitrogen feed composition. The temperature of the ethylene on the support tube is controlled by the temperature on the ethylene heat exchanger. In five of ten runs, essentially all of the liquid is vaporized.

The resin average particle size is found to be strongly influenced by the "dryness" or "wetness" of the catalyst fluid exiting the nozzle. Decreasing the amount of liquid causes the APS to decrease to a minimum corresponding to a region in which essentially all or most of the liquid is vaporized (based on the equation of state). As the tip temperature increases further, the resin APS increases steadily.

It is found that the resin settled bulk density increases as the catalyst spray dries out. At some point, however, as it reaches dryness or about that point, the bulk density decreases over a small temperature range. At higher tip temperatures, corresponding to super heat, the resin morphology improves such that the bulk density increased to (internal diameter) removable tip. The injection tube is mounted inside a 3 inch support tube shroud containing nitrogen. The end of the tip extends approximately 2 inches past the shroud. The nitrogen shroud is used to center the catalyst injection line and minimize the amount of ethylene around the capillary tip. The injection tube and nitrogen shroud are enclosed inside a cycle gas purge flow used to create a resin free tone around the injection tip. By minimizing the collisions between the evaporating catalyst droplets and the fluidized bed, this design promotes the formation of new catalyst particles. The cycle gas purge flow is diverted from the cycle gas line via a 1 inch tie-in located between the compressor and the cooler. Nitrogen carrier and atomization assist gas are added at nominally 5 pph (pounds per hour) to the catalyst injection tube.

The polymerization temperature is maintained at 85 degrees C. with an ethylene partial pressure of 200 psi in the reactor. Total reactor pressure is 350 psig. Hydrogen is used to control molecular weight and hexene-1 to control polymer density. The resulting MI ranges from about 0.50 to 2.61 dg/min and the density from 0.923 to 0.925 g/cc. The temperature of the catalyst and carrier fluids ranges from about 22 to 31 degrees C. at the nozzle tip as calculated by a heat transfer mass transfer calculation for the fluid passing through the injection tube. Although there is significant cooling due to evaporation of the isopentane and hexane carriers into the nitrogen carrier gas, the temperature of the fluid returns to close to ambient prior to entering the encasement at the nitrogen shroud. This nitrogen shroud flow is not heated, so the tip temperatures remain relatively low.

Several experiments are conducted as part of an experimental design to explore the effects of different isopentane and hexane carrier flows on the resin average particle size and the settled resin bulk density. Isopentane carrier ranges from 58 to 400 cc/hr. Hexane carrier 14 ranges from "0" to 309 cc/hr.

There is a minimum in the APS of about 0.025 inch and a maximum in the bulk density of about 18.5 lbs/cu ft at about 230 cc/hr isopentane and 110 cc/hr hexane flow. The composition of the spray, whether "dry" or "wet" and the liquid content is estimated for each case based on the tip temperature, fluid composition and pressure. The APS is seen to pass through a local minimum and the bulk density through a local maximum in agreement with the results obtained in Example 11. The results demonstrate that the shift between "wet" and "dry" sprays can be accomplished by changing the feed composition to the catalyst injection tube, i.e., adjusting the relative amounts of light and heavy solvents and/or carriers.

It is noted that APS and bulk density contour plots show a small minimum and maximum, respectively, as isopentane is increased from 150 to 300 cc/hr for the low hexane and no hexane dry cases.

The effect of tip pressure is examined. It can be seen that the "operating" curves for the tip evaporation do not change much as the assumed pressure in the injection tube is increased. The total pressure drop across the nitrogen carrier line to the reactor, including 10 feet of two-phase flow through the injection tube, is only 60 psi, so it is likely that the pressure drop across the tip is less than 10 psi.

What is claimed is:

1. A process, carried out in the gas phase, comprises contacting one or more olefins with a catalyst system, the catalyst system containing (A) a carrier gas, and (B) a mixture of (i) solids comprising a transition metal compound or complex, (ii) and a liquid organic solvent, under polymerization conditions, in a fluidized bed reactor containing resin particles in a fluidized state with the provisos that (a) the mixture of solids and solvent contains at least about 95 percent by weight solids and (b) the mixture is sprayed with the carrier gas into a particle-lean zone, or the fluidized bed, of the reactor.

2. The process defined in claim 1 wherein the mixture of solids and solvent is essentially solids.

3. A process carried out in the gas phase comprising contacting one or more olefins with a catalyst system, the catalyst system containing (A) a carrier gas, and (B) a mixture of (i) solids comprising a transition metal compound or complex, and (ii) a liquid organic solvent, under polymerization conditions, in a fluidized bed reactor containing resin particles in a fluidized state with the following provisos: (a) the catalyst system is first introduced into one or more nozzles each having an inlet at one end and an exit tip at the other end, said nozzles being adapted to convert the catalyst system into droplets and spray the droplets into the fluidized bed reactor;

(b) the temperature of the catalyst system, as introduced into each nozzle, is in the range of about minus 20 to about plus 120 degrees C.;

(c) the weight ratio of the carrier gas to the solvent, as introduced into each nozzle, is in the range of about 0.1 5:1 to about 20:1;

(d) the weight ratio referred to in proviso (c) is adjusted to provide a temperature in the nozzle and at the tip of each nozzle at about the dew point of the solvent;

(e) the temperature provided in proviso (d) is such that the droplets formed at the tip of the nozzle contain at least about 95 percent by weight solids; and (f) the droplets are sprayed from the nozzle into a particle-lean zone, or the fluidized bed, of the reactor.

4. The process defined in claim 3 wherein the droplets in proviso (e) are essentially solids.

5. The process defined in claim 3 wherein the temperature in proviso (b) is in the range of about 0 to about 40 degrees C.

6. The process defined in claim 3 wherein the weight ratio in proviso (c) is in the range of about 0.25:1 to about 6:1.

7. The process defined in claim 3 wherein the olefins are ethylene; ethylene and one or more alpha-olefins; propylene; or propylene and one or more alpha-olefins.

8. The process defined in claim 3 wherein the transition metal compound or complex is a metallocene complex.

9. The process defined in claim 3 wherein the organic solvent is comprised of isopentane, hexane, or a mixture of said solvents.

10. The process defined in claim 1 wherein the carrier gas is nitrogen.

11. A process for the polymerization of olefins in the gas phase comprising (i) contacting ethylene; ethylene and one or more alpha-olefins; propylene; or propylene and one or more alpha-olefins with a liquid catalyst system, adapted for olefin polymerization, containing nitrogen carrier gas and a mixture of solids comprising a metallocene complex and at least one organic solvent selected from the group consisting of isopentane, hexane, and mixture of said solvents, under polymerization conditions, in a fluidized bed reactor containing resin particles in a fluidized state with the following provisos:

(a) the catalyst system is first introduced into one or more nozzles, each having an inlet at one end and an exit tip at the other end, said nozzles being adapted to convert the catalyst system into droplets and spray the droplets into the fluidized bed reactor;

(b) the temperature of the catalyst system, as introduced into each nozzle, is in the range of about 0 to about 30 degrees C.; (c) the weight ratio of the carrier gas to the solvent, as introduced into each nozzle, is in the range of about 0.25:1 to about 6:1; (d) the weight ratio referred to in proviso (c) is adjusted to provide a temperature in the nozzle and at the tip of each nozzle at about the dew point of the solvent;

(e) the temperature provided in proviso (d) is such that the droplets formed at the tip of the nozzle are essentially solids; and (f) the droplets are sprayed from the nozzle into a particle-lean zone, or the fluidized bed, of the reactor.

* * * * *